United States Patent [19]

Hara

[11] Patent Number: 4,577,202

[45] Date of Patent: Mar. 18, 1986

[54] LIQUID JET RECORDING HEAD

[75] Inventor: Toshitami Hara, Tokyo, Japan

[73] Assignee: Canon Kabushiki Kaisha, Tokyo, Japan

[21] Appl. No.: 558,981

[22] Filed: Dec. 7, 1983

[30] Foreign Application Priority Data

Dec. 11, 1982 [JP] Japan ............................... 57-217582

[51] Int. Cl.⁴ ............................................ G01D 15/18

[52] U.S. Cl. ............................................... 346/140 R

[58] Field of Search .................................... 346/140 R

[56] References Cited

U.S. PATENT DOCUMENTS 4,335,389 6/1982 Shirato et al. .................. 346/140 R 4,450,457 5/1984 Miyachi et al. ................. 346/140 R

FOREIGN PATENT DOCUMENTS 51837 4/1979 Japan ............................. 346/140 R 2007162B 5/1979 United Kingdom ............ 346/140 R

*Primary Examiner*—Joseph W. Hartary

*Assistant Examiner*—Gerald E. Preston

*Attorney, Agent, or Firm*—Fitzpatrick, Cella, Harper & Scinto

[57] ABSTRACT

A liquid jet recording head, comprising a liquid discharging section having an orifice for discharging liquid to form liquid droplets and a liquid pathway, being connected to said orifice and having a heat acting portion at which heat energy for forming liquid droplets acts on liquid as a part of its constitution, a common liquid chamber for storage of said liquid to be supplied to said pathway and an electro-thermal transducer, having at least a pair of confronting electrodes connected electrically to a heat generating resistance layer provided on a substrate thereby forming a heat generating section between these electrodes, characterized in that an upper layer comprises a first layer constituted of an inorganic dielectric material, a second layer constituted of an organic material and a third layer constituted of an inorganic material, these layers being laminated in this order from the side of said electrodes on at least the portion of said electrodes lying beneath said common liquid chamber or on the portion at the upstream side of said heat generating portion.

34 Claims, 7 Drawing Figures

LIQUID JET RECORDING HEAD

BACKGROUND OF THE INVENTION

1. Field of the Invention

This invention relates to a liquid jet recording head which performs recording by jetting a liquid to form flying liquid droplets.

2. Description of the Prior Art

Ink jet recording methods (liquid jet recording methods) are recently attracting attention for such advantages that generation of noise during recording is negligibly very small, that high speed recording is possible and also that recording can be done on so called plain paper without need of the special treatment of fixing.

Among them, the liquid jet recording method as disclosed in, for example, Japanese Laid-open Patent Application No. 51837/1979, Deutsche Offenlegungsschrift (DOLS) 2843064 has a specific feature different from other liquid jet recording methods in that the driving force for discharging liquid droplets is obtained by permitting heat energy to act on a liquid.

That is to say, according to the recording method disclosed in the above patent publications, liquid which has received action of heat energy undergoes a change in state accompanied with an abrupt increase of volume, and through the acting force based on the change in state is discharged liquid through the orifice at the tip end of the recording head section to be formed into flying liquid droplets, which liquid droplets are attached onto a material to be recorded, thereby effecting recording thereon.

In particular, the liquid jet recording method disclosed in the publication of DOLS No. 2843064 is not only applicable very effectively for the so called drop-on demand recording method, but also can easily be embodied into a recording head in which the recording head portion is made into a high density multi-orifice of full line type, thus being capable of giving images of high resolution and high quality at high speed.

The recording head section of the device to be applied for the above-mentioned method has a liquid discharging portion having an orifice provided for discharging liquid and a liquid pathway, which is connected to the orifice and has a heat acting portion at which heat energy acts on liquid for discharging liquid droplets, and an electro-thermal transducer as a means for generating heat energy. And, the electrothermal transducer has a pair of electrodes and a heat generating resistance layer which is connected to these electrodes and has a region for heat generation (heat generating portion) between these electrodes.

A typical example exhibiting the structure of such a liquid jet recording head is shown in FIG. 1(*a*) and FIG. 1(*b*). FIG. 1(*a*) is the front view of a liquid jet recording head as seen from the orifice side, and FIG. 1(*b*) is a partial sectional view of FIG. 1(*a*) when cut along a dot and dash line X - Y.

The recording head 100 has a structure having formed orifices 104 and liquid discharging sections 105 by bonding a grooved plate 103 provided with a certain number of grooves of certain width and depth at a predetermined line density to a substrate 102 provided on its surface with an electro-thermal transducer 101 so as to cover over the surface of the substrate 102. In the case of the recording head as shown in the FIG. 1, it is shown as having a plural number of orifices 104. Of course, the present invention is not limited to such embodiments, but also a recording head with a single orifice is included in the scope of the present invention.

The liquid discharging section 105 has an orifice 104 for discharging liquid at its terminal end and a heat acting portion 106, which is the place where heat energy generated from an electro-thermal transducer 101 acts on liquid to generate a droplet and cause abrupt change in state through expansion and shrinkage of its volume.

The heat acting portion 106 is positioned above the heat generating portion 107 of the electrothermal transducer 101 and has a heat acting face 108 in its bottom surface to be contacted with the liquid at the heat generating portion 107.

The heat generating portion 107 is constituted of a lower layer 109, a heat generating resistance layer 110 provided on the lower layer 109 and an upper layer 111 provided on the heat generating resistance layer 110. The heat generating resistance layer 110 is provided on its surface with electrodes 112 and 113 for passage of current to the layer 110. The electrode 112 is common to the heat generating portions of the respective liquid discharging sections, while the electrode 113 is a selective electrode by selecting the heat generating portion of each liquid discharging section for heat generation and is provided along the liquid pathway of the liquid discharging section.

The upper layer 111 has the function of separating the heat generating resistance layer 110 from the liquid filling the liquid pathway of the liquid discharging section for protection of the heat generating resistance layer 110 chemically or physically against the liquid employed at the heat generating portion 107, and also has the protective function for the heat generating resistance layer 110 to prevent short-circuit through the liquid between the electrodes 112 and 113. The upper layer 111 also serves to be under charge of preventing electrical leakage between adjacent electrodes. In particular, prevention of electrical leakage are between the respective selective electrodes or prevention of electric corrosion, which will occur by passage of current between the electrode under each liquid pathway and the liquid which may happen to be contacted for some reason, is important and for this purpose the upper layer 111 having such a protective function is provided at least on the electrode existing under the liquid pathway.

Further, the liquid pathway provided at each liquid discharging section is connected upstream thereof to the common liquid chamber (not shown in the Figure) for storage of the liquid to be supplied to said liquid pathway, and the electrode connected to the electrothermal transducer provided at each liquid discharging section is generally provided for convenience in designing so that it may pass beneath the aforesaid common liquid chamber on the side upstream of the heat acting portion. Accordingly, it is generally practiced to provide the upper layer as described above even at this portion in order to prevent contact between the electrode and the liquid.

Whereas, the above-mentioned upper layer is required to have characteristics which are different depending on the place at which it is to be provided. For example, at the heat generating portion 107, it is required to be excellent in (1) heat resistance, (2) liquid resistance, (3) liquid penetration prevention, (4) thermal conductivity, (5) antioxidation property, (6) dielectric property and (7) breaking resistance, while in regions other than the heat generating portion 107, it is required to be excellent sufficiently in liquid penetration prevention, liquid resistance and breaking resistance, although these may be somewhat alleviated depending on the thermal conditions.

However, there is nowadays no material for constituting the upper layer which can satisfy all of the above characteristics (1) to (7) as desired, and under the present situation, some of the characteristics (1) to (7) are placed under alleviated requirements. That is to say, choice of material in the heat generating portion is done with preference posed on (1), (4) and (5), while in other portions than the heat generating portion 107, for example, the electrode portion, choice of material is done with preference posed on (2), (3) and (7), thus forming the upper layers with the use of corresponding materials on the respective regional faces.

On the other hand, as different from these, in the case of a multi-orifice type liquid jet recording head, formation of respective layers and partial removal of the layers formed are conducted repeatedly on a substrate in the manufacturing step for the purpose of forming a number of minute electro-thermal transducer simultaneously on the substrate. At the stage when the upper layer is formed, the surface on which the upper layer is to be formed is formed in minute concavo-convex shape with slab wedge portion (stepped portion), and therefore the step coverage characteristic of the upper layer at this stepped portion becomes important. In short, if the step coverage characteristic at this stepped portion is not enough, penetration of liquid will occur at that portion, whereby electric corrosion or breaking of dielectric strength may be induced. Also, when the upper layer is susceptible to occurrence of failures at a probability which is not low during manufacturing, liquid will penetrate through the failures to cause markedly lowering of life of the electro-thermal transducer.

For the reasons as mentioned above, the upper layer is required to be good in step coverage characteristic at the stepped portion, low in probability of occurrence of pinholes in the layer formed or if formed at all, are so small as to be negligible.

However, in the prior art, no liquid jet recording head has been proposed, which can satisfy all of these requirements and is excellent in overall use durability.

SUMMARY OF THE INVENTION

The present invention has been accomplished in view of the various points as mentioned above and a primary object of the present invention is to provide a liquid jet recording head which is excellent in overall durability in frequently repeated uses or continuous uses for a long time and can maintain stably the initial good liquid droplet forming characteristic for a long term.

Another object of the present invention is to provide a liquid jet recording head which is high in reliability in manufacturing working.

Further, it is also another object of the present invention to provide a liquid jet recording head which is high in yield also when made into a multi-orifice type.

According to the present invention, there is provided a liquid jet recording head, comprising a liquid discharging section having an orifice for discharging liquid to form liquid droplets and a liquid pathway, being connected to said orifice and having a heat acting portion at which heat energy for forming liquid droplets acts on liquid as a part of its constitution, a common liquid chamber for storage of said liquid to be supplied to said pathway and an electro-thermal transducer, having at least a pair of confronting electrodes connected electrically to a heat generating resistance layer provided on a substrate thereby to form a heat generating section between these electrodes, which comprises having an upper layer comprising a first layer constituted of an inorganic insulating material, a second layer constituted of an organic material and a third layer constituted of an inorganic material laminated in this order from the side of said electrodes on at least the portion of said electrodes lying beneath said common liquid chamber.

According to the present invention, there is provided a liquid jet recording head, comprising an orifice for discharging liquid to form liquid droplets, a liquid pathway, being connected to said orifice and having a heat acting portion at which heat energy for forming liquid droplets acts on liquid as a part of its constitution, and an electro-thermal transducer, having at least a pair of confronting electrodes connected electrically to a heat generating resistance layer provided along said liquid pathway thereby to form a heat generating section between these electrodes, which comprises having an upper layer comprising a first layer constituted of an inorganic dielectric material, a second layer constituted of an organic material and a third layer constituted of an inorganic material laminated in this order from the side of said electrodes on the portion on the upstream side of said heat generating portion.

DETAILED DESCRIPTION OF THE PREFERRED EMBODIMENTS

Figure 1B:
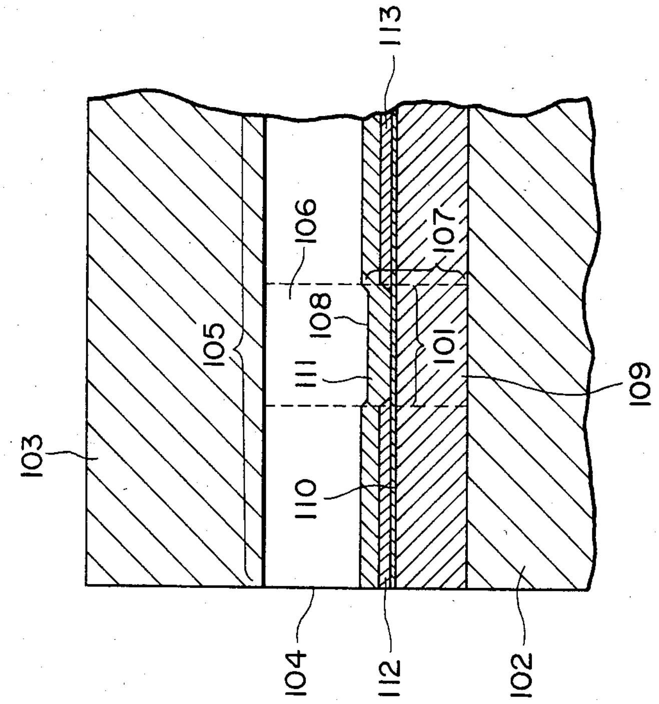
FIG. 1b PRIOR ART
FIGS. 1(*a*) and (*b*) are each presented for illustration of the constitution of a liquid jet recording head of the prior art, FIG. 1(*a*) showing a schematic partial front view and FIG. 1(*b*) sectional view, partially cut, taken along a dot and dash line X-Y in FIG. 1(*a*)

Referring now to the drawings, the liquid jet recording head of the present invention is to be described in detail.

FIG. 2(*a*) shows a partial plan view as seen from the orifice side for illustration of the principal part of the structure according to a preferred embodiment of the liquid jet recording head; and FIG. 2(*b*) shows a partial sectional view when taken along the dot and dash line A-A' in FIG. 2(*a*). FIG. 2(*a*) corresponds to FIG. 1(*a*) as described previously, while FIG. 2(*b*) corresponds to FIG. 1(*b*).

The liquid jet recording head 200 shown in the drawings is constituted at its main part of a substrate for liquid jet recording utilizing heat for liquid discharging provided with a desired number of electrothermal transducers 201 and a grooved plate 203 having a desired number of grooves provided corresponding to said electro-thermal transducers.

The substrate 202 and the grooved plate 203 are bonded to each other at predetermined positions with an adhesive or other means, whereby a liquid pathway 204 is formed by the portion of the substrate on which the electro-thermal transducer 201 is provided and the groove portion of the grooved plate 203, said liquid pathway 204 having a heat acting portion 205 as a part of its constitution.

The substrate 202 has a support 206 constituted of silicon, glass, ceramics, etc., a lower layer 207 constituted of $SiO_2$, etc. provided on said support 206, a heat generating resistance layer 208, a common electrode 209 and a selection electrode 210 provided along the liquid pathway with leaving a space on the upper surface of the heat generating resistance layer 208, and an upper layer 211 which covers over the portion of the heat generating resistance layer which is not covered with electrodes and the portions of electrodes 209 and 210.

The electro-thermal transducer 201 has a heat generating section 212 as its main part, and the heat generating section 212 is constituted of laminates provided successively from the side of the support 206, namely a lower layer 207, a heat generating layer 208, a first layer 216 constituted of an inorganic dielectric material (hereinafter abbreviated as the first layer) and a third layer 217 constituted of an inorganic material (hereinafter abbreviated as the third layer), the surface 213 of the third layer (heat acting face) is contacted directly with the liquid filling the liquid pathway 204.

On the other hand, most of the surface of the selection electrode 210 is covered with an upper layer 211 comprising the first layer 216, a second layer 214 constituted of an organic material (hereinafter abbreviated as the second layer) and the third layer laminated in this order from the electrode side, said upper layer being also provided in such a form at the bottom portion of the common liquid chamber 219 provided upstream of the liquid pathway 204.

In the case of the liquid jet recording head 200 shown in FIG. 2, the upper layer of the common electrode 209 has a structure having an upper layer 211 without second layer 214 provided thereon. The present invention is not limited to such an embodiment, but an upper layer 211 having the same second layer as the surface of the selection electrode 210 may also be provided. However, in the case of the liquid jet recording head as shown in FIG. 2, as can be seen from the plan view shown in FIG. 2(*c*), there is not provided the second layer 214 in the liquid pathway in each liquid discharging section (formed above the heat acting surface 213 at the tip portion on the orifice side of the electrode and the selection electrode 210) on the orifice side with respect to the heat acting surface 213. Accordingly, before and behind the heat acting surface 213 in the direction of liquid pathway, as can also be seen from the sectional view in FIG. 2(*b*), the step difference between the surface position of the upper layer 211 on the common electrode 209 can be only the step difference created by provision of the common electrode 209, whereby stability of liquid discharging is more excellent as compared with the case when the upper layer 211 having the second layer is provided also on the common electrode 209.

In other words, in the case of the liquid jet recording head 200 shown in FIG. 2, the bottom face of the liquid pathway on the orifice side with respect to the heat acting surface 213 is relatively smooth with no appreciable amount of concavo-convex irregularity, whereby formation of liquid droplets can be done stably. However, if the step difference $\Delta d$ formed between the surface position of the upper layer 211 on the common electrode 209 and the surface position of the heat acting surface 213 is negligibly small as compared with the distance d between the upper face 215 and the heat acting surface 213 in the liquid pathway 204, it will have no substantial effect on formation of liquid droplets. Therefore, within such a range, there is no problem if an upper layer having the second layer may also be provided on the common electrode 209.

The primary function of the first layer 216 provided as the lowest layer of the upper layer 211 is to maintain insulation between the common electrode 209 and the selection electrode 210, and it is constituted of a material also relatively excellent in thermal conductivity and heat resistance, for example, an inorganic oxide such as $SiO_2$, etc. or an inorganic dielectric material such as inorganic nitrides (e.g. $Si_3N_4$).

As the material constituting the first layer 216, there may be included, in addition to the inorganic materials as mentioned above, transition metal oxides such as titanium oxide, vanadium oxide, niobium oxide, molybdenum oxide, tantalum oxide, tungsten oxide, chromium oxide, zirconium oxide, hafnium oxide, lanthanum oxide, yttrium oxide, manganese oxide and the like; metal oxides such as aluminum oxide, calcium oxide, strontium oxide, barium oxide, silicon oxide and complexes thereof; high electric resistance nitrides such as silicon nitride, aluminum nitride, boron nitride, tantalum nitride, etc. and complexes of these oxides and nitrides; further thin film materials such as semiconductors of amorphous silicon, amorphous selenium, etc. which have low electric resistance as bulk but can be made to have high resistance during the manufacturing steps such as by the sputtering method, the CVD method, the vapor deposition method, the gas phase reaction method, the liquid coating method and others. Its layer thickness may be preferably 0.1 to 5 $\mu$m, more preferably 0.2 to 3 $\mu$m, most preferably 0.5 to 3 $\mu$m.

The second layer 214 is provided in the form laminated on the surface of the first layer at the main surface of the substrate which can probably be contacted with the liquid as in the liquid pathway 204 and the common liquid chamber [see FIG. 2(*b*)], and its principal function resides in prevention of liquid penetration and liquid resistance action. And, further by providing the second layer so as to cover even the electrode wiring section 212 behind the common liquid chamber 219 through the intermediary first layer, the electrode wiring section can be prevented from occurrence of damages or breaking of wire at the electrode wiring section during manufacturing steps.

The second layer 214 is constituted of an organic material capable of forming a layer having the characteristics as previously described and it is further desired to have such physical properties as (1) good film forming property, (2) close structure with small amount of pinholes, (3) being not swollen or dissolved in the ink employed, (4) good dielectric property when fabricated into film and (5) high heat resistance and the like. Such organic materials may include the following resins, for example, silicone resin, fluorine resin, aromatic polyamide, addition polymerization type polyimide, polybenzimidazole, metal chelate polymer, poly(titanic acid ester), epoxy resin, phthalic resin, thermosetting phenol resin, p-vinyl phenol resin, Zirox resin, triazine resin, BT resin (addition polymerized resin of triazine resin and bismaleimide) and others. Beside these, it is also possible to form the second layer 214 by vapor deposition of a polyxylene resin or derivatives thereof.

Further, the second layer 214 can also be formed by film formation according to the plasma polymerization with the use of various organic monomers, including, for example, thiourea, thioacetamide, vinyl ferrocene, 1,3,5-trichlorobenzene, chlorobenzene, styrene, ferrocene, pyroline, naphthalene, pentamethylbenzene, nitrotoluene, acrylonitrile, diphenyl selenide, p-toluidine, p-xylene, N,N-dimethyl-p-toluidine, toluene, aniline, diphenyl mercury, hexamethylbenzene, malononitrile, tetracyanoethylene, thiophene, benzeneselenol, tetrafluoroethylene, ethylene, N-nitrosodiphenylamine, acetylene, 1,2,4-trichlorobenzene, propane, etc.

However, if it is desired to form a high density multiorifice type recording head, an organic material different from those as mentioned above which can very easily be subjected to minute lithographic working may desirably be employed as the material for forming the second layer 214. Examples of such organic materials may include, for example:

(A) Polyimidoisoindoloqunazoline dione (trade name: PIQ, produced by Hitachi Kasei Co., Japan)

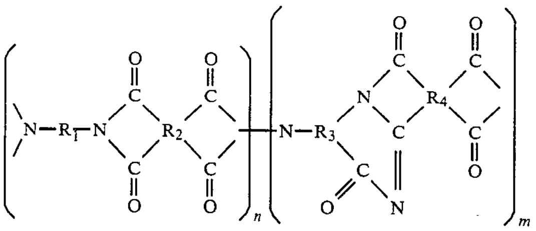

(B) Polyimide resin (trade name: PYRALIN, produced by Du Pont, U.S.A.)

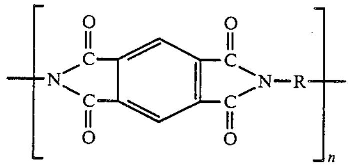

(C) Cyclized polybutadiene (trade name: JSR-CBR, produced by Japan Synthetis Rubber co., Japan); (Heat resistive photoresist)

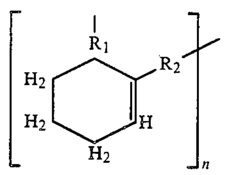

(D) Photonith (trade name: produced by Toray Co., Japan),
and other photosensitive polyimide resins as preferable ones. (The above formulae are examples of the structural formula generally accepted after formation of the hardened layer)..

When the second layer 214 is formed by use of these organic materials of which minute photolithographic working can easily be done, it is desirable to apply anchor coat treatment by use of the so called "anchor coating agent" on the surface on which said layer is to be formed before formation of the second layer 214 in order to enhance adhesion with the first layer 216 to be provided beneath said layer 214. Examples of such anchor coating agents are aluminum alcoholate type anchor coating agents, particularly commercially available as the anchor coating agents for the organic material (A) above.

Various silane coupling agents are commercially available from various companies. In the present invention, for example, those produced by Shinetsu Kagaku Co., Japan as set forth below may be preferably employed:

KA/003 Vinyltrichlorosilane: $CH_2{=}CHSiCl_3$

KBE/003 Vinyltriethoxysilane: $CH_2{=}CHSi(OC_2H_5)_3$

KBC/003 Vinyltris(β-methoxyethoxy)silane: $CH_2{=}CHSi(OCH_2CH_2OCH_3)_3$

KBM303 β-(3,4-epoxycyclohexyl)ethyltrimethoxysilane:

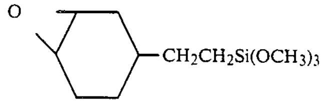

KBM403 γ-glycidooxypropyltrimethoxysilane:

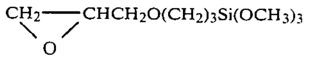

KBM503 γ-methacryloxypropyltrimethoxysilane:

$$CH_2{=}C(CH_3){-}CO(CH_2)_3Si(OCH_3)_3 \quad (\text{C=O})$$

KBM602 n-(dimethoxymethylsilylpropyl)ethylenediamine:

$$H_2N(CH_2)_2NH(CH_2)_3Si(OCH_3)_2(CH_3)$$

KBM603 n-(trimethoxysilylpropyl)ethylenediamine: $H_2N(CH_2)_2NH(CH_2)_3Si(OCH_3)_3$ The second layer thus prepared may have a thickness preferably of 0.1 to 20 μm, more preferably 0.1 to 5 μm, most preferably 0.5 to 2 μm.

The principal role of the third layer 117 to be provided as the uppermost layer of the upper layer 111 is to impart liquid resistance and reinforcement of mechanical strength. The third layer 117 is provided as the outermost surface substantially all over the surface of the liquid jet substrate which may possibly be brought into contact with the liquid such at the regions such as the liquid pathway 204 and the common liquid chamber 219, and it is constituted of a material which is tenacious, relatively excellent in mechanical strength and can be closely contacted with and adhered to the first layer 216 and the second layer 214, and may be for example, a metal material such as Ta when the layer 216 is constituted of $SiO_2$. Thus, by providing the third layer 217 constituted of an inorganic material, which is relatively tenacious with sufficient mechanical strength, such as a metal as the surface layer of the upper layer 211, particularly at the heat acting face 213, the shock from cavitation action generated on liquid discharging can sufficiently be absorbed to give the effect of elongating to a great extent the life of the electro-thermal transducer.

As the material which can form the third layer 217, in addition to Ta as mentioned above, there may be employed the elements of the group IIIa of the periodic table such as Sc, Y and others, the elements of the group IVa such as Tl, Zr, Hf and others, the elements of the group VIa such as Cr, Mo, W and others, the elements of the group VIII such as Fe, Co, Ni and others; alloys of the above metals such as Ti-Ni, Ta-W, Ta-Mo-Ni, Ni-Cr, Fe-Co, Ti-W, Fe-Ti, Fe-Ni, Fe-Cr, Fe-Ni-Cr and others; borides of the above metals such as Ti-B, Ta-B, Hf-B, W-B and others; carbides of the above metals such as Ti-C, Zr-C, V-C, Ta-C, Mo-C, Ni-C and others; silicides of the above metals such as Mo-Si, W-Si, Ta-Si and others; nitrides of the above metals such as Ti-N, Nb-N, Ta-N and others; and so on. The third layer can be formed according to the vapor deposition method, the sputtering method, the CVD method, etc. and its thickness may be preferably 0.01 to 5 μm, more preferably 0.1 to 5 μm, most preferably 0.2 to 3 μm. In choice of the material and its thickness, the layer is preferably made to have a specific resistivity of 1 ohm.cm or less, and it is also possible to use an dielectric material having strong mechanical impact resistance such as Si-C.

The third layer can be a single layer as described, but some of these can of course be combined. Also, for the material of the third layer, in place of a single material as mentioned above, such a layer material may be combined with the material of the first layer. For example, good results can be obtained by laminating successively $SiO_2$ as the first layer and PIQ as the second layer, followed by lamination of $SiO_2$ and Ta as the third layer.

In the liquid jet recording head of the present invention, it is critical that the upper layer should be constituted of a first layer of an inorganic dielectric material, a second layer of an organic material and a third layer of an inorganic material laminated in this order from the electrode side. If the first layer through the third layer are not laminated in this order, but a second layer consisting of, for example, PIQ is laminated directly on the electrodes 209, 210, and a first layer of $SiO_2$ and a third layer of Ta are laminated thereon, there may be caused phenomena such that dielectric characteristics deteriorate due to carbonized resin remaining on the heat generating resistance layer, so that closeness between the heat generating layer and $SiO_2$ at this portion is reduced and the closeness between the electrodes and resin becomes insufficient. As the result, when the liquid jet recording head is employed for a long term, peel-off will occur at these portions and reduce durability. In the liquid jet recording head of the present invention, by provision of a first inorganic dielectric layer directly on the heat generating resistance layer and the electrode layer, followed by provision of a second layer consisting of a resin such as PIQ on the upper face of the first layer, it is possible to circumvent occurrence of the above problem, thus enabling formation of the upper layer which is resistant even to immersion of a liquid such as ink for a long term.

The lower layer 207 is provided as a layer for controlling the flow of heat generated primarily from the heat generating portion 212 toward the side of the support 206. Choice of the material and designing of the layer thickness for the lower layer are done so that, when heat energy is permitted to act on liquid at the heat acting portion 205, the heat generated from the heat generating portion 212 may be controlled to be flown in greater amount, while when current passage to the electro-thermal transducer 201 is turned off, the heat remaining in the heat generating portion 212 may be flown rapidly toward the side of the support 206. Examples of the materials constituting the lower layer 207 may include $SiO_2$ as previously mentioned and inorganic materials, typically metal oxides such as tantalum oxide, magnesium oxide, aluminum oxide and the like.

For the material constituting the heat generating resistance layer 208, it is possible to employ most of the materials which can generate heat as desired by charge of current.

More specifically, such materials may include, for example, tantalum nitride, nickel-chromium, silver-palladium alloy, silicon semiconductors, or metals such as hafnium, lanthanum, zirconium, titanium, tantalum, tungsten, molybdenum, niobium, chromium, vanadium, etc., alloys thereof and borides thereof as preferable ones.

Among the materials constituting the heat generating resistance layer 208, especially a metal boride may be mentioned as excellent one, and above all hafnium boride has the best characteristic, and next to this compound there are zirconium boride, lanthanum boride, vanadium boride and niobium boride with better characteristic in the order mentioned.

The heat generating resistance layer 208 can be formed by use of the materials as mentioned above according to the method such as electron beam vapor deposition or sputtering.

The layer thickness of the heat generating layer may be determined depending on its area, material, and the shape and the size of the heat acting portion, further on the power consumption in practical aspect, so that the heat quantity per unit time may be as desired, but preferably 0.001 to 5 μm, more preferably 0.01 to 1 μm.

As the material constituting the electrodes 209 and 210, most of the electrode materials conventionally employed may be used effectively. For example, there may be employed metals such as Al, Ag, Au, Pt, Cu, etc. and, by use of these metals, the electrodes can be provided at predetermined positions according to the method such as vapor deposition to desired size, shapes and thicknesses.

As the material constituting the constituent member for the common liquid chamber 219 provided on the side upstream of the grooved plate 203 and the heat acting portion 205, most of the materials are effectively available, so long as they are free or substantially free from the influence on shape by the heat during working of the recording head or under environment during usage and capable of being applied with minute precise working easily with its face precision being easily attained, and further can be worked so that the liquid may be flown smoothly through the pathways formed by such workings.

Typical examples of such materials may include ceramics, glass, metal, plastic or wafery silicon as preferable ones. In particular, glass or wafery silicon is one of preferable materials, since it can easily be worked and has appropriate heat resistance, thermal expansion coefficient and thermal conductivity. In order to prevent the circumferential surface of the orifice 218 from coming therearound of the liquid leaked, it is preferred to apply on the outer surface around the orifice 218 water repelling treatment in the case of an aqueous liquid and oil repelling treatment in the case of a non-aqueous liquid.

FIG. 2(*d*) is a partial sectional view taken along a dot and dash line B—B shown in FIG. 2(*b*).

In the liquid jet recording head 200, as shown in FIG. 2(*c*) and (*d*), the second layer 214 of the upper layer 211 is eliminated in the liquid pathway 204 at the portion from the heat acting face 213 to the orifice 218, but provided at the portion on the orifice side except on the liquid pathway. As a modification of the embodiment, it will arouse no trouble if the second layer 214 may not be provided over the whole region on the orifice side with respect to the heat acting face 213 [that is, the portion corresponding to the part upper than the line C-C' in FIG. 2(*c*)].

However, as a more preferable embodiment, there is an embodiment in which, as shown in FIG. 2(*c*), the electrode portion except on the liquid pathway 204 is covered even on the orifice side with respect to the heat acting face 213 with the second layer 214 through the first layer.

Figure 3:
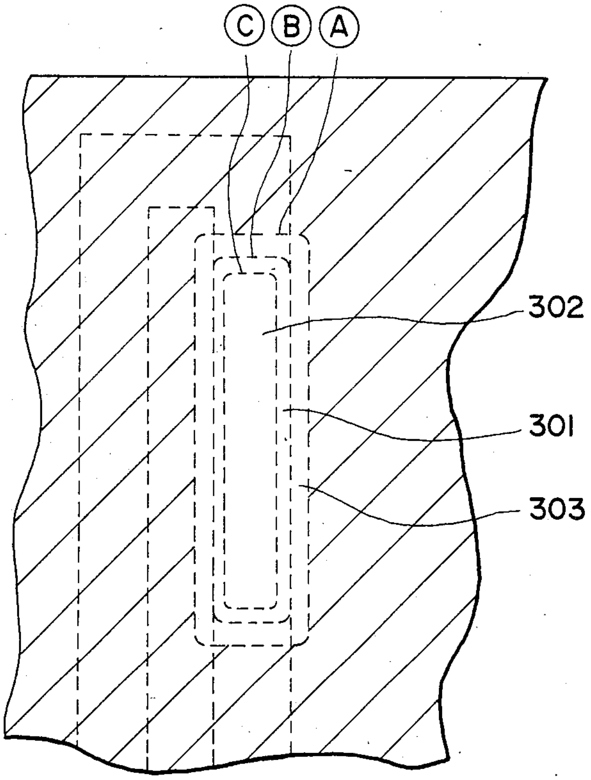
FIG. 3 is a schematic plan view showing the principal part of another embodiment of the present invention.

FIG. 3 is a schematic partial plan view showing the covered region in the case when all the region except for the heat acting face is covered with a second layer through a first layer. The frame shown by (B) is the actual heat acting face 301 and, in the present invention, the second upper layer may be provided, excluding only the region of the heat acting face 301 as shown by the frame (B), or, as shown by the frame (A), the second upper layer may be provided, excluding the region 303 broader than the heat acting face 301. Alternatively, as shown by the frame (C), the second upper layer may be provided, excluding the region 302 narrower region than the heat acting face 301.

The present invention is now described by referring to Example.

EXAMPLE

An Si wafer was thermally oxidized to be formed into a $SiO_2$ film with a thickness of 5 μm to provide a substrate. On the substrate was formed by sputtering a heat generating resistance layer of $HfB_2$ to a thickness of 1500 Å, followed successive deposition of Ti layer of 50 Å and Al layer of 5000 Å according to electron beam vapor deposition.

By way of the photolithographic steps, the pattern as shown in FIG. 2(*c*) was formed and the size of the heat acting face was found to be 30 μm in width and 150 μm in length, with the electric resistance being 150 ohm, including the resistance of the electrodes.

As the next step, over the whole surface of the substrate, $SiO_2$ was laminated by sputtering to a thickness of 2.2 μm (formation of the first layer). Subsequently, PIQ layer (the second layer) was prepared on the hatched portion in FIG. 2(*c*) according to the following steps.

That is to say, the substrate having formed the first layer thereon was washed and dried, followed by spinner coating with PIQ solution (spinner coating were 500 rpm, 10 sec. in the first step, 4000 rpm, 40 sec. in the second step). Next, the coated product was left to stand at 80° C. for 10 minutes. After drying the solvent, tentative baking was conducted at 220° C. for 60 minutes. On the dried film was coated by spinner a photoresist OMR-83 (produced by Tokyo Oka Co., Japan). After drying, the product was exposed to light by means of a mask aligner and subjected to developing treatment to obtain a desired PIQ layer pattern. Then, with the use of an etchant for PIQ, etching of the PIQ layer was effected. After washing with water and drying, the photoresist was peeled off with a peeling liquid for OMR, followed by baking at 350° C. for 60 minutes to complete the step for formation of the PIQ layer pattern. The portion removed around the heat acting face is as shown in FIG. 2(*c*) and its size was 50 μm×250 μm.

The PIQ layer had a thickness of 2.0 μm at the portion having no heat generating resistance layer and electrode on the support and a thickness of 1.8 μm at the heat portion over the generating resistance layer and the electrode faces. This indicates good step coverage characteristic.

After formation of the second layer, a third layer comprising Ta was laminated to thickness of 0.5 μm over the whole upper face according to sputtering. Then, on this substrate was adhered a grooved glass plate as determined. That is to say, as shown in FIG. 2(*b*), a grooved glass plate (groove size: width 50 μm×depth 50 μm×length 2 mm) for forming ink inlet pathways and heat acting portion is adhered onto the substrate.

When a pulse voltage of 10 μS, 30 V was applied at 3 KHz on the electro-thermal transducer of the thus prepared recording head, the liquid was discharged in correspondence to the applied signals to form flying liquid droplets stably.

When formation of such droplets is repeated, breaking of wire may occur in a head defectively manufactured due to electric corrosion of Al electrodes or dielectric breakdown between the Ta protective layer and Al electrodes to result in suspension for discharging ink. The number of repetition as far as the suspension is defined as the durable number according to the present invention.

Figure 1A:
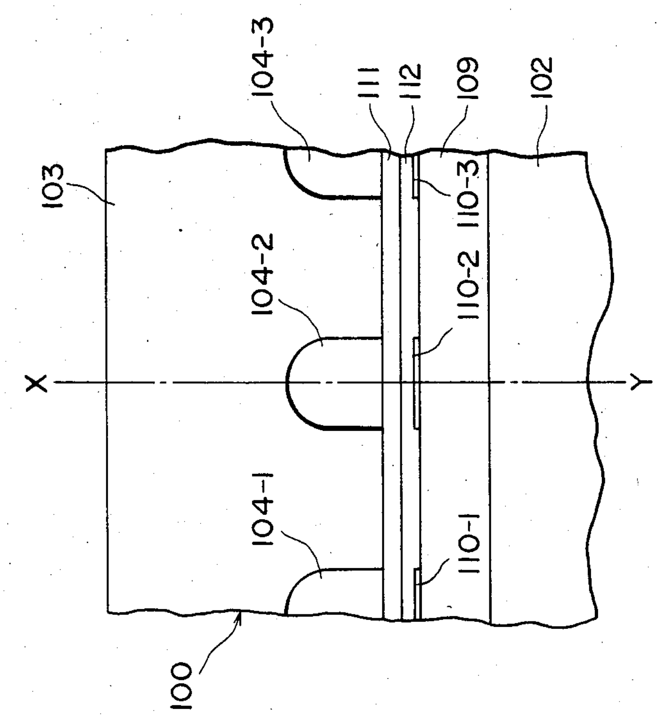
FIG. 1a PRIOR ART
Figure 2A:
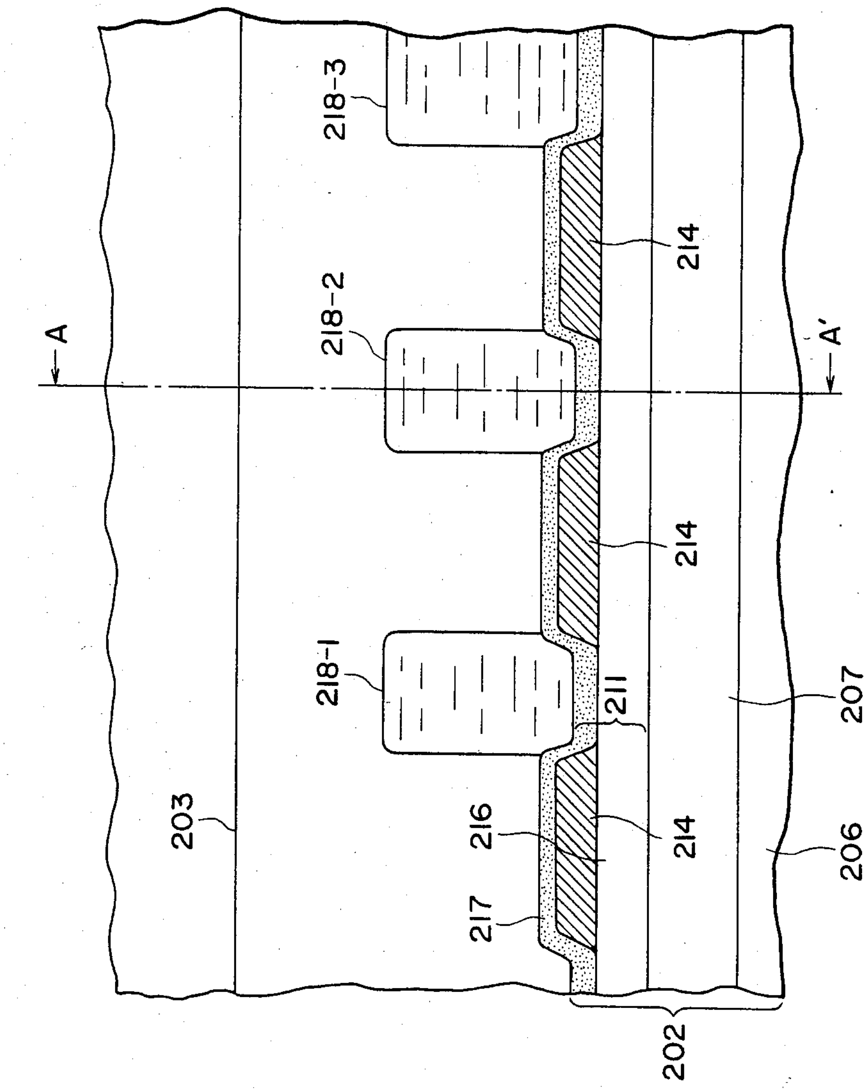
FIGS. 2(*a*), (*b*), (*c*) and (*d*) are each presented for illustration of the constitution of a liquid recording head according to the present invention, FIG. 2(*a*) showing a schematic front view, FIG. 2(*b*) a sectional view, partially cut, taken along a dot and dash line A-A' in FIG. 2(*a*), FIG. 2(*c*) a schematic plan view of substrate and FIG. 2(*d*) a sectional view, partially cut, taken along a dot and dash line B—B in FIG. 2(*b*)
Figure 2B:
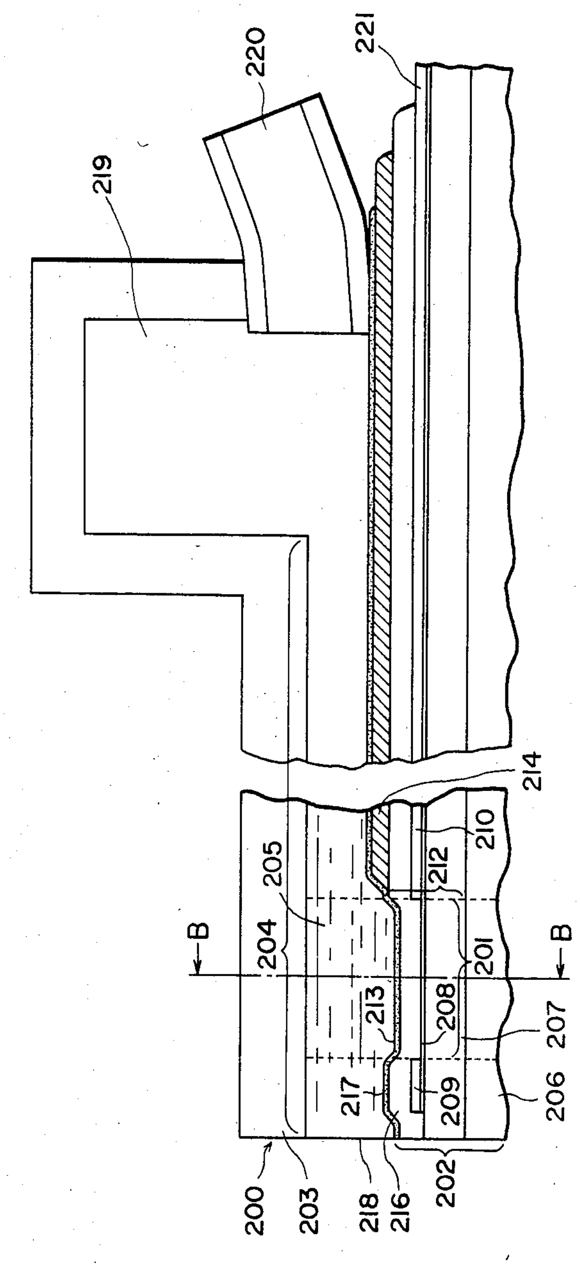
Figure 2C:
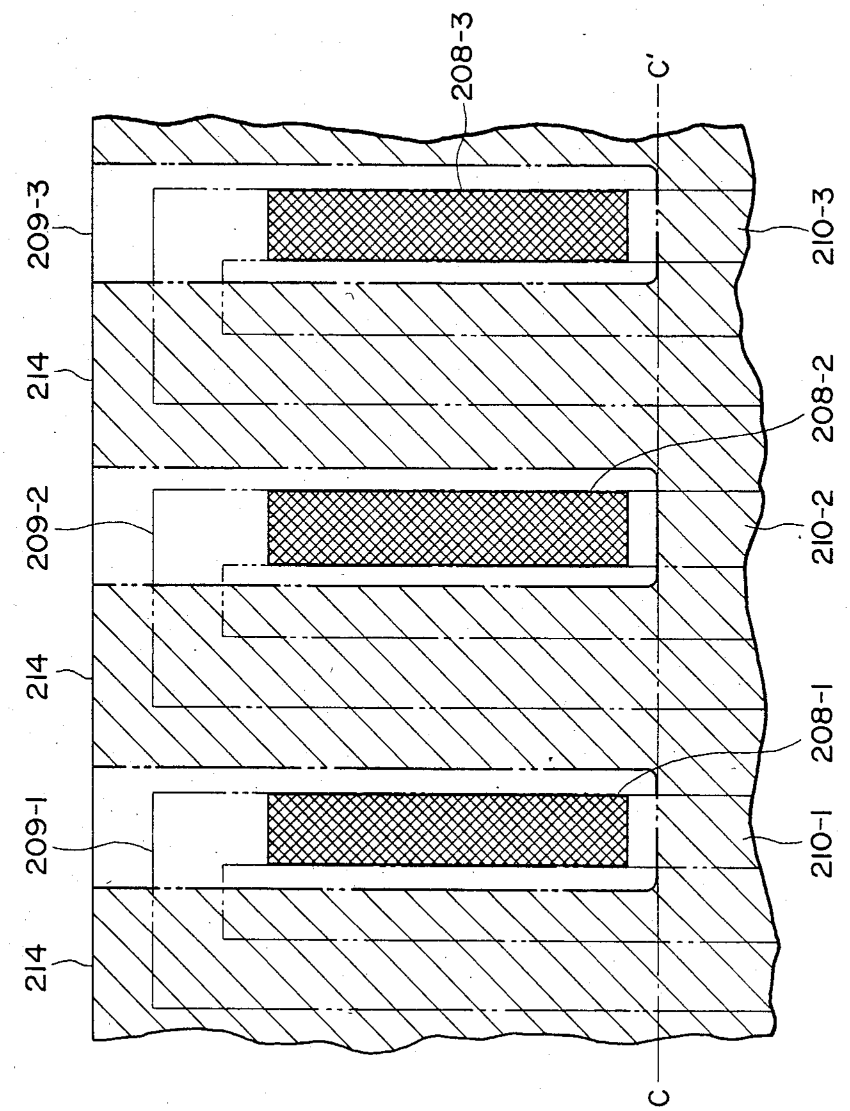
Figure 2D:
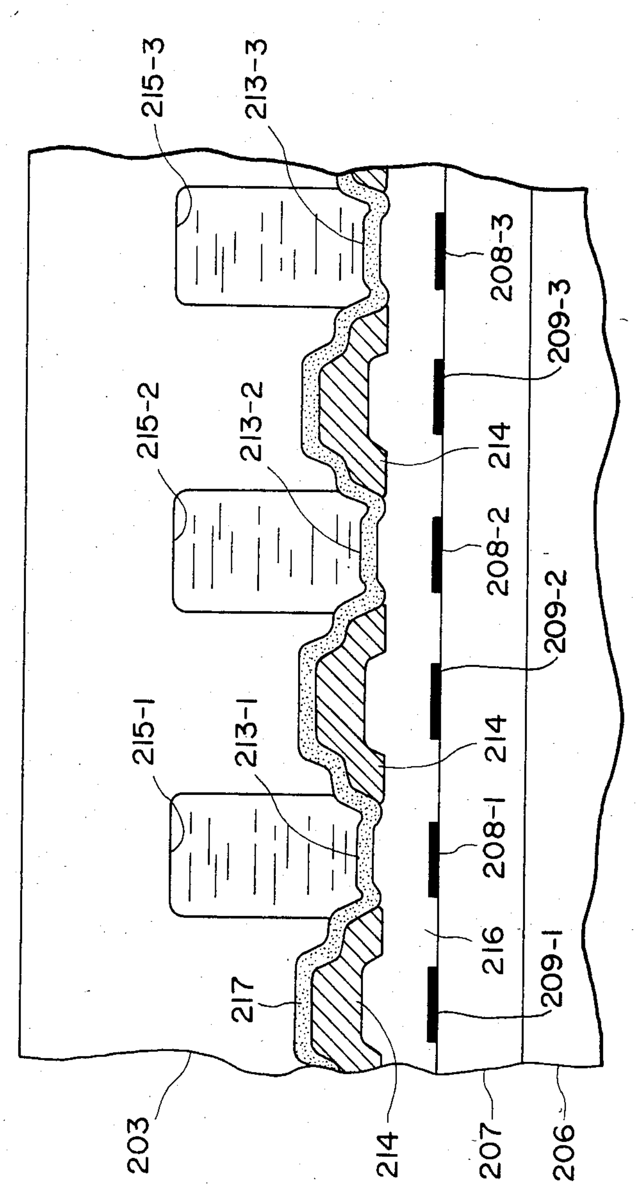

For the three samples of the head: sample (a) according to Example of this invention, sample (b) in which the PIQ layer was not laminated in sample (a) and sample (c) in which PIQ layer, $SiO_2$ layer and Ta layer were successively laminated from the electrode side, durable numbers were compared by operating each head, in $5\times10^7$ times per day for 20 days to obtain the results as shown in FIG. 1 (the rate of defective head under repetitional application in FIG. 1 was evaluated with the results of 1000 samples).

TABLE 1

| Sample head | Rate of Defective Heads under Repetitional Application — Repetitional Number (times): less than $10^7$ | $10^7$–$10^9$ | more than $10^9$ |
|---|---|---|---|
| (a) | 0% | 0.1% | 99.9% |
| (b) | 96% | 4% | 0% |
| (c) | 0% | 7% | 93% |

As apparently seen from the results as shown in Table 1, the durable number of $10^9$ times can be attained stably in the head according to the present invention. Therefore, it is suitable for use as a multi-head. In the head (b), deterioration of durability was markedly seen due to electric corrosion of Al electrodes by penetration of the recording liquid through the pinholes in the sputtered layer of $SiO_2$ and Ta, and dielectric breakdown between the Al electrode and Ta layer. In the head (c), after the lapse of $2\times10^8$ times repetition in five days, peel-off between $SiO_2$ layer and $HfB_2$ layer occurred, and mechanical breaking or dielectric breakdown were thereby increased at the heat generating portion.

What is claimed is:

1. A liquid jet recording head, comprising:

a liquid discharging section having an orifice for discharging liquid in liquid droplets and a liquid pathway connected to said orifice, said liquid pathway having a heat acting portion for applying heat energy to liquid in said portion for forming liquid droplets;

a liquid chamber for storage of liquid to be supplied to said liquid pathway;

an electro-thermal transducer including at least a pair of confronting electrodes connected electrically to a heat generating resistance layer provided on a substrate for forming a heat generating section between said electrodes, at least one of said electrodes having a least a portion thereof underlying said liquid chamber; and an upper layer on at least said portion of said one electrode and including a first layer comprising an inorganic dielectric material, a second layer comprising an organic material and a third layer comprising an inorganic material, laminated in this order from the surface of said one electrode.

2. A liquid jet recording head according to claim 1, wherein the inorganic dielectric material of the first layer is an inorganic oxide.

3. A liquid jet recording head according to claim 1, wherein the inorganic dielectric material of the first layer is an inorganic nitride.

4. A liquid jet recording head according to claim 1, wherein the inorganic dielectric material of the first layer is a complex of an inorganic oxide and an inorganic nitride.

5. A liquid jet recording head according to claim 1, wherein the first layer is constituted of a high resistance thin film material.

6. A liquid jet recording head according to claim 1, wherein the first layer has a thickness of 0.1 to 5 μm.

7. A liquid jet recording head according to claim 1, wherein the organic material of the second layer is a resin.

8. A liquid jet recording head according to claim 1, wherein the organic material of the second layer is an organic compound monomer.

9. A liquid jet recording head according to claim 1, wherein the second layer is constituted of a hardened film of a photosensitive resin.

10. A liquid jet recording head according to claim 1, wherein the second layer has a thickness of 0.1 to 20 μm.

11. A liquid jet recording head according to claim 1, wherein the inorganic material of the third layer contains an element of the group III of the periodic table.

12. A liquid jet recording head according to claim 1, wherein the inorganic material of the third layer contains an element of the group IV of the periodic table.

13. A liquid jet recording head according to claim 1, wherein the inorganic material of the third layer contains an element of the group VI of the periodic table.

14. A liquid jet recording head according to claim 1, wherein the inorganic material of the third layer contains an element of the group VIII of the periodic table.

15. A liquid jet recording head according to claim 1, wherein the third layer has a specific resistivity of 1 ohm.cm or less.

16. A liquid jet recording head according to claim 1, wherein the third layer is formed of an inorganic material in combination with an inorganic dielectric material for forming the first layer.

17. A liquid jet recording head according to claim 1, wherein the third layer has a thickness of 0.01 to 5 μm.

18. A liquid jet recording head, comprising:

an orifice for discharging liquid liquid droplets;

a liquid pathway for providing a flow path for liquid to said orifice and having a heat acting portion for applying heat energy to liquid in said portion for forming liquid droplets;

an electro-thermal transducer including at least a pair of confronting electrodes connected electrically to a heat generating resistance layer provided along said liquid pathway for forming a heat generating section between said electrodes; and an upper layer on at least a portion of one of said electrodes upstream of said heat generating portion of said upper layer including a first layer comprising an inorganic dielectric material, a second layer comprising an organic material and a third layer comprising an inorganic material, laminated in this order from the surface of said portion of said one electrode.

19. A liquid jet recording head according to claim 18, wherein the inorganic dielectric material of the first layer is an inorganic oxide.

20. A liquid jet recording head according to claim 18, wherein the inorganic dielectric material of the first layer is an inorganic nitride.

21. A liquid jet recording head according to claim 18, wherein the inorganic dielectric material of the first layer is a complex of an inorganic oxide and an inorganic nitride.

22. A liquid jet recording head according to claim 18, wherein the first layer is constituted of a high resistance thin film material.

23. A liquid jet recording head according to claim 18, wherein the first layer has a thickness of 0.1 to 5 μm.

24. A liquid jet recording head according to claim 18, wherein the organic material of the second layer is a resin.

25. A liquid jet recording head according to claim 18, wherein the organic material of the second layer is an organic compound monomer.

26. A liquid jet recording head according to claim 18, wherein the second layer is constituted of a hardened film of a photosensitive resin.

27. A liquid jet recording head according to claim 18, wherein the second layer has a thickness of 0.1 to 20 μm.

28. A liquid jet recording head according to claim 18, wherein the inorganic material of the third layer contains an element of the group III of the periodic table.

29. A liquid jet recording head according to claim 18, wherein the inorganic material of the third layer contains an element of the group IV of the periodic table.

30. A liquid jet recording head according to claim 18, wherein the inorganic material of the third layer contains an element of the group VI of the periodic table.

31. A liquid jet recording head according to claim 18, wherein the inorganic material of the third layer contains an element of the group VIII of the periodic table.

32. A liquid jet recording head according to claim 18, wherein the third layer has a specific resistivity of 1 ohm.cm or less.

33. A liquid jet recording head according to claim 18, wherein the third layer is formed of an inorganic material in combination with an inorganic dielectric material for forming the first layer.

34. A liquid jet recording head according to claim 18, wherein the third layer has a thickness of 0.01 to 5 μm.

* * * * *

UNITED STATES PATENT AND TRADEMARK OFFICE

CERTIFICATE OF CORRECTION

PATENT NO. : 4,577,202

DATED : March 18, 1986

INVENTOR(S) : Toshitami Hara

It is certified that error appears in the above-identified patent and that said Letters Patent is hereby corrected as shown below:

Column 1, line 48, change "electrothermal" to --electro-thermal--

Column 2, line 39, change "leakage are between" to --leakage between--.

Column 3, line 23, change "transducer" to --transducers--.

Column 4, line 35, change "l(b) sectional" to --l(b) a sectional--; and
line 65, change "electrothermal" to --electro-thermal--

Column 7, line 49, change "Synthetis" to --Synthetic--.

Column 9, line 26, change "an dielectric" to --a dielectric--.

Column 11, line 16, change "upper than" to --above--; and
line 45, change "followed successive" to --followed by successive--.

Column 14, line 6, change "liquid liquid" to --liquid in liquid--

Signed and Sealed this

Twenty-fifth Day of November, 1986

*Attest:*

DONALD J. QUIGG

*Attesting Officer* *Commissioner of Patents and Trademarks*